(12) United States Patent
Kojima (10) Patent No.: US 8,073,878 B2
(45) Date of Patent: Dec. 6, 2011

(54) METHOD TO GENERATE LINKAGE INDICATIVE DATA, COMPUTER USABLE MEDIUM THEREFOR, AND PRINTING APPARATUS

(75) Inventor: Atsushi Kojima, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 552 days.

(21) Appl. No.: 12/212,246

(22) Filed: Sep. 17, 2008

(65) Prior Publication Data

US 2009/0089302 A1 Apr. 2, 2009

(30) Foreign Application Priority Data

Oct. 2, 2007 (JP) ................................. 2007-258867

(51) Int. Cl.
*G06F 7/00* (2006.01)
(52) U.S. Cl. ........................................ 707/804; 707/805
(58) Field of Classification Search .................. 707/755, 707/726, 804, 805
See application file for complete search history.

(56) References Cited

U.S. PATENT DOCUMENTS

| | | | | |
|---|---|---|---|---|
| 5,809,250 A | * | 9/1998 | Kisor | 709/227 |
| 6,195,679 B1 | * | 2/2001 | Bauersfeld et al. | 709/203 |
| 7,085,801 B1 | * | 8/2006 | Abdelhadi et al. | 709/201 |
| 2004/0003351 A1 | * | 1/2004 | Sommerer et al. | 715/517 |
| 2004/0210829 A1 | * | 10/2004 | Cristofari et al. | 715/501.1 |

FOREIGN PATENT DOCUMENTS

JP 2005-004322 1/2005

* cited by examiner

*Primary Examiner* — Robert Timblin
*Assistant Examiner* — James E Richardson
(74) *Attorney, Agent, or Firm* — Scully, Scott, Murphy & Presser, PC (57) ABSTRACT

A method to generate linkage indicative data for a linkage indicative diagram, representing a linkage at least between two information resources being interrelated with each other, in a printing apparatus, is provided. The method includes collecting at least two pieces of primary linkage information respectively identifying the at least two information resources and subsidiary linkage information included in each of the at least two plurality of information resources, storing the collected subsidiary linkage information in association with corresponding one of the at least two pieces of primary linkage information in a storage, judging whether each of the at least two pieces of primary linkage information stored in the storage is included in the subsidiary linkage information, determining the linkage between the at least two information resources, and creating the linkage indicative data to represent the linkage indicative diagram.

20 Claims, 9 Drawing Sheets

FIG. 1

Page 1 xxxx xxx xx
Link to : Page 2
xxxx xxx xx
xxxx xxx xx
Link to : Page 3
Link to : Page 5
xxxx xxx xx
xxxx xxx xx
xxxx xxx xx
Link to : Page 6
xxxx xxx xx
Link to : Page 7
xxxx xxx xx
xxxx xxx xx

Page 2 xxxx xxx xx
Link to : Page 4
xxxx xxx xx
xxxx xxx xx
Link to : Page 8
Link to : Page 9
Link to : Page 10
xxxx xxx xx

Page 3 xxxx xxx xx
xxxx xxx xx
xxxx xxx xx
Link to : Page 11
xxxx xxx xx
Link to : Page 12
xxxx xxx xx
Link to : Page 13
xxxx xxx xx

Page 4 xxxx xxx xx
xxxx xxxxx
Link to : Page 14
xxxx xxx xx
xxxx xxx xx
Link to : Page 15
xxxx xxx xx
Link to : Page 16
xxxx xxx xx
xxxx xxx xx
xxxx xxx xx
xxxx xxx xx
xxxx xxx xx

| PRIMARY URL | SUBSIDIARY URLS | | | | | |
|---|---|---|---|---|---|---|
| Page 1 | Page 2 | Page 3 | Page 5 | Page 6 | Page 7 | |

FIG.5B

| PRIMARY URL | SUBSIDIARY URLS | | | | | |
|---|---|---|---|---|---|---|
| Page 1 | Page 2 | Page 3 | Page 5 | Page 6 | Page 7 | |
| Page 2 | Page 4 | Page 8 | Page 9 | Page 10 | | |

FIG.5C

| PRIMARY URL | SUBSIDIARY URLS | | | | | |
|---|---|---|---|---|---|---|
| Page 1 | Page 2 | Page 3 | Page 5 | Page 6 | Pag e7 | |
| Page 2 | Page 4 | Page 8 | Page 9 | Page 10 | | |
| Page 3 | Page 11 | Page 12 | Page 13 | | | |

FIG.5D

| PRIMARY URL | SUBSIDIARY URLS | | | | | |
|---|---|---|---|---|---|---|
| Page 1 | Page 2 | Page 3 | Page 5 | Page 6 | Page 7 | |
| Page 2 | Page 4 | Page 8 | Page 9 | Page 10 | | |
| Page 3 | Page 11 | Page 12 | Page 13 | | | |

| PRIMARY URL | SUBSIDIARY URLS | | | | | |
|---|---|---|---|---|---|---|
| Page1 | Page2 | Page3 | Page5 | Page6 | Page7 | |

FIG.7B

| PRIMARY URL | SUBSIDIARY URLS | | | | | |
|---|---|---|---|---|---|---|
| Page 1 | Page 2 | Page 3 | Page 5 | Page 6 | Page 7 | |
| Page 3 | Page 11 | Page 12 | Page 13 | | | |

FIG.7C

| PRIMARY URL | SUBSIDIARY URLS | | | | | |
|---|---|---|---|---|---|---|
| Page 1 | Page 2 | Page 3 | Page 5 | Page 6 | Page 7 | |
| Page 3 | Page 11 | Page 12 | Page 13 | | | |
| Page 4 | Page 14 | Page 15 | Page 16 | | | |

FIG.7D

| PRIMARY URL | SUBSIDIARY URLS | | | | | |
|---|---|---|---|---|---|---|
| Page 1 | Page 2 | Page 3 | Page 5 | Page 6 | Page 7 | |
| Page 3 | Page 11 | Page 12 | Page 13 | | | |
| Page 4 | Page 14 | Page 15 | Page 16 | | | |
| Page 14 | | | | | | |

FIG.7E

| PRIMARY URL | SUBSIDIARY URLS | | | | | |
|---|---|---|---|---|---|---|
| Page 1 | Page 2 | Page 3 | Page 5 | Page 6 | Page 7 | |
| Page 3 | Page 11 | Page 12 | Page 13 | | | |
| Page 4 | Page 14 | Page 15 | Page 16 | | | |
| Page 14 | | | | | | |

Specified web page

METHOD TO GENERATE LINKAGE INDICATIVE DATA, COMPUTER USABLE MEDIUM THEREFOR, AND PRINTING APPARATUS

CROSS REFERENCE TO RELATED APPLICATION

This application claims priority from Japanese Patent Application No. 2007-258867, filed on Oct. 2, 2007, the entire subject matter of which is incorporated herein by reference.

BACKGROUND

1. Technical Field

An aspect of the present invention relates to a method to generate data indicative of a linkage structure of interrelated information resources, a printing apparatus to print the linkage information, and a computer usable medium therefor.

2. Related Art

Figure 10:
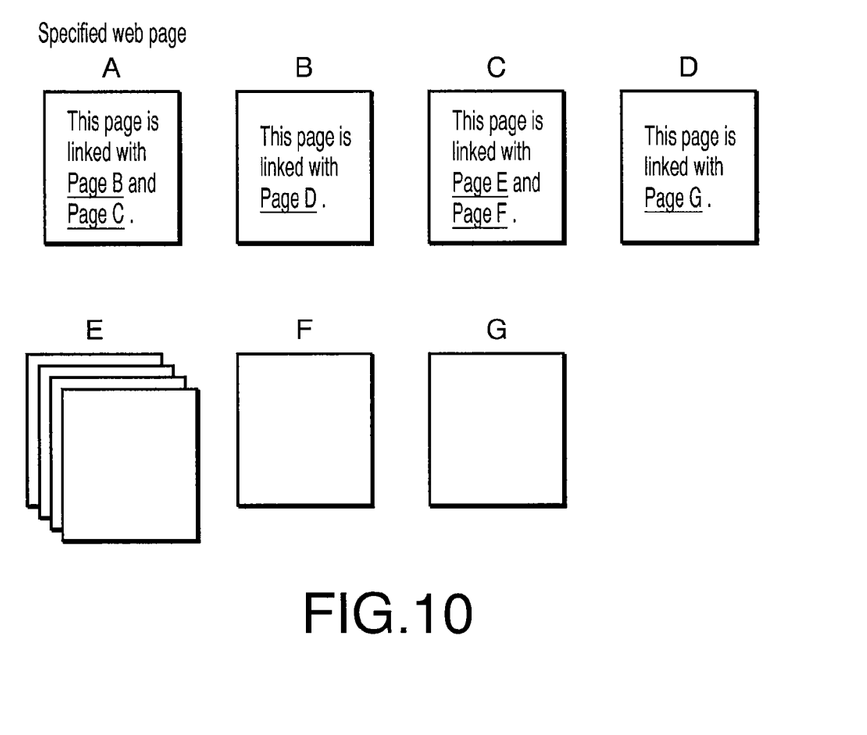
FIG. 10 illustrates interrelated information resources to be used to generate a linkage indicative tree.

When information resources which are interrelated with one another are used, a linkage structure of the resources can present beneficial information to a user. Linkage indicative data to indicate the linkage structure can be generated by a computer program. FIG. 10 illustrates interrelated information resources A, B, and C. When a URL (uniform resource locator) indicating a location of the information resource A is specified by the user, the information resource A is searched to obtain URLs which indicate locations of the other information resources B and C. When the information resource A is searched through, next, the linked information resources B, C, are further searched for a URL which is not yet obtained. For example, according to the present example shown in FIG. 10, the information resource B is searched through, and a URL which indicates a location of an information resource D is obtained. A computer program to perform such a linkage searching and obtaining operation is disclosed, for example, in Japanese Patent Provisional Publication 2005-4322.

Figure 11:
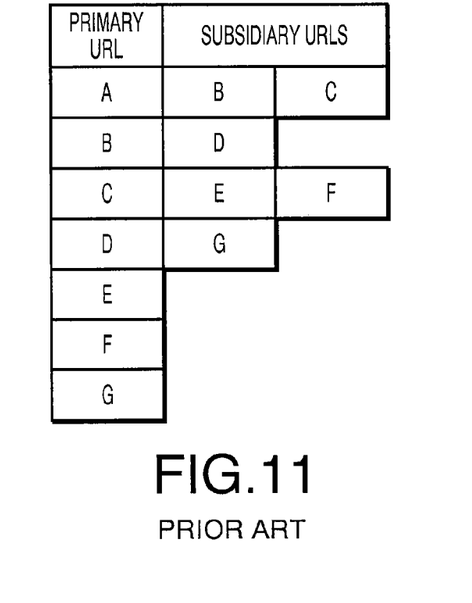
FIG. 11 illustrates linkage information concerning URLs obtained in a conventional link search operation.
Figure 12:
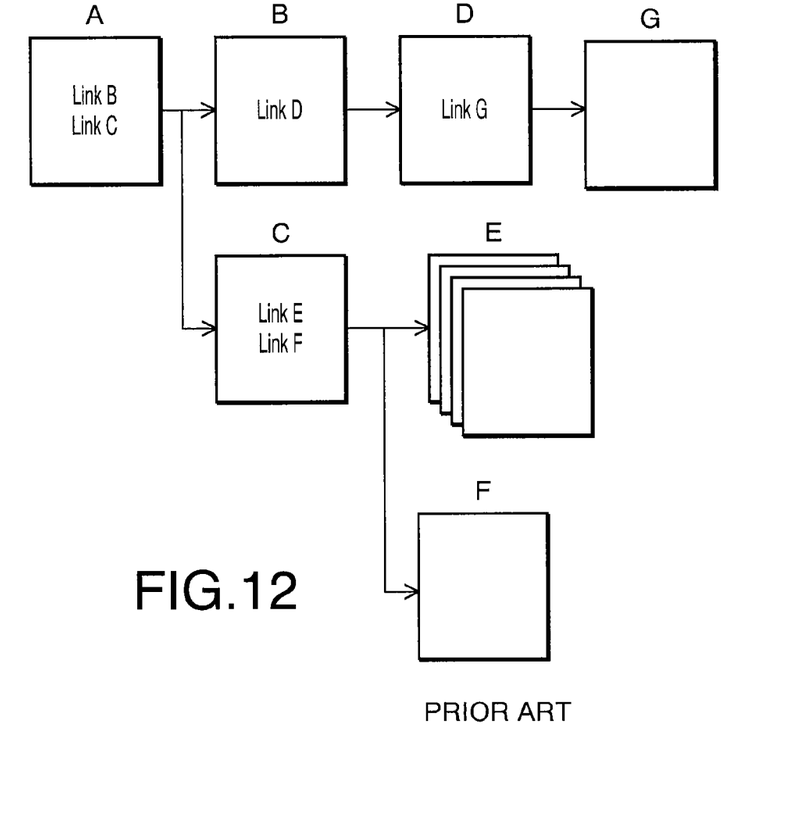
FIG. 12 illustrates a linkage indicative tree to present the linkage information generated in the a conventional linkage indicative tree generating program.

FIG. 11 illustrates linkage information concerning the URL obtained in the linkage searching operation as described above. When the interrelated information resources are searched through and the URLs included in the information resources are obtained, the URLs are organized to make the linkage information as shown in FIG. 11. FIG. 12 illustrates a linkage indicative tree to present the linkage information generated in the above-referenced program to be displayed on a screen. According to the above-referenced program, contents of an information resource included in a specific area of the linkage indicative tree specified by a user can be printed on a recording medium. Further, the linkage indicative tree indicating the linkage structure of the interrelated information resources can be printed.

SUMMARY

Even with the program as described above, however, the linkage information may not necessarily be valuably utilized when a large number of information resources are linked with one information resource, and/or a large number of information resources are intricately interlinked with one another. Rather, the linkage information can be complicated and devaluated by the complexity. Further, when the complicated linkage information is collected through the above-described linkage searching operation, generating the linkage indicative tree may require longer time, and the linkage indicative tree being displayed can also be complicated and difficult to comprehend for the user. In this regard, it is to be noted that information resources to be accessed through the internet (i.e., information stored in numerous servers) can be substantially limitless. Accordingly, the process time to generate the linkage indicative tree can be considerably long.

In view of the above drawbacks, the present invention is advantageous in that a method to generate linkage indicative data for a linkage indicative diagram that represents a linkage at least between two information resources being interrelated with each other, in a printing apparatus, is provided. The method includes collecting at least two pieces of primary linkage information respectively identifying the at least two information resources, of which contents are instructed to be printed, and subsidiary linkage information included in each of the at least two plurality of information resources, the subsidiary linkage information identifying a subsidiary information resource, storing the collected subsidiary linkage information in association with corresponding one of the at least two pieces of primary linkage information in a storage, judging whether each of the at least two pieces of primary linkage information stored in the storage is included in the subsidiary linkage information stored in the storage, determining the linkage between the at least two information resources, one of the at least two information resources being linked to the other of the at least two information resources if the primary linkage information of the one of the at least two information resources is included in the subsidiary linkage information associated with the other of the at least two primary linkage information, and creating the linkage indicative data to represent the linkage indicative diagram that represents the linkage at least between the two information resources based on the linkage determined by the step of determining.

According to the method, the linkage indicative tree is configured to represent the information resources, of which contents have been printed during the collecting period. Therefore, the created linkage indicative tree can indicate the linkage between the at least two information resources in a simple manner so that the information resources can be valuably used.

According to another aspect of the present invention, a computer usable medium is provided. The computer usable medium includes computer readable instructions to control a printing apparatus to generate linkage indicative data for a linkage indicative diagram that indicates a linkage at least between two information resources being interrelated with each other, by executing steps of collecting at least two pieces of primary linkage information respectively identifying the at least two information resources, of which contents are instructed to be printed, and subsidiary linkage information included in each of the at least two plurality of information resources, the subsidiary linkage information identifying a subsidiary information resource, storing the collected subsidiary linkage information in association with corresponding one of the at least two pieces of primary linkage information in a storage, judging whether each of the at least two pieces of primary linkage information stored in the storage is included in the subsidiary linkage information stored in the storage, determining the linkage between the at least two information resources, one of the at least two information resources being linked to the other of the at least two information resources if the primary linkage information of the one of the at least two information resources is included in the subsidiary linkage information associated with the other of the at least two primary linkage information, and creating the linkage indicative data to represent the linkage indicative diagram that represents the linkage at least between the two information resources based on the linkage determined by the step of determining.

According to the computer usable medium, the linkage indicative tree is configured to represent the information resources, of which contents have been printed during the collecting period. Therefore, the created linkage indicative tree can indicate the linkage between the at least two information resources in a simple manner so that the information resources can be valuably used.

According to still another aspect of the present invention, a printing apparatus is provided. The printing apparatus prints a linkage indicative diagram that represents a linkage at least between two information resources being interrelated with each other. The printing apparatus includes a collecting unit to collect at least two pieces of primary linkage information respectively identifying the at least two information resources, of which contents are instructed to be printed, and subsidiary linkage information included in each of the at least two plurality of information resources, the subsidiary linkage information identifying a subsidiary information resource, a storing unit to store the collected subsidiary linkage information in association with corresponding one of the at least two pieces of primary linkage information in a storage, a judging unit to judge whether each of the at least two pieces of primary linkage information stored in the storage is included in the subsidiary linkage information stored in the storage, a determining unit to determine the linkage between the at least two information resources, one of the at least two information resources being linked to the other of the at least two information resources if the primary linkage information of the one of the at least two information resources is included in the subsidiary linkage information associated with the other of the at least two primary linkage information, a linkage indicative data creating unit to create the linkage indicative data to represent the linkage indicative diagram that represents the linkage at least between the two information resources based on the linkage determined by the determining unit, and a printing unit to print the linkage indicative diagram on a recording medium.

According to the printing apparatus, the linkage indicative tree is configured to represent the information resources, of which contents have been printed during the collecting period. Therefore, the created linkage indicative tree can indicate the linkage between the at least two information resources in a simple manner so that the information resources can be valuably used.

DETAILED DESCRIPTION

Figure 1:
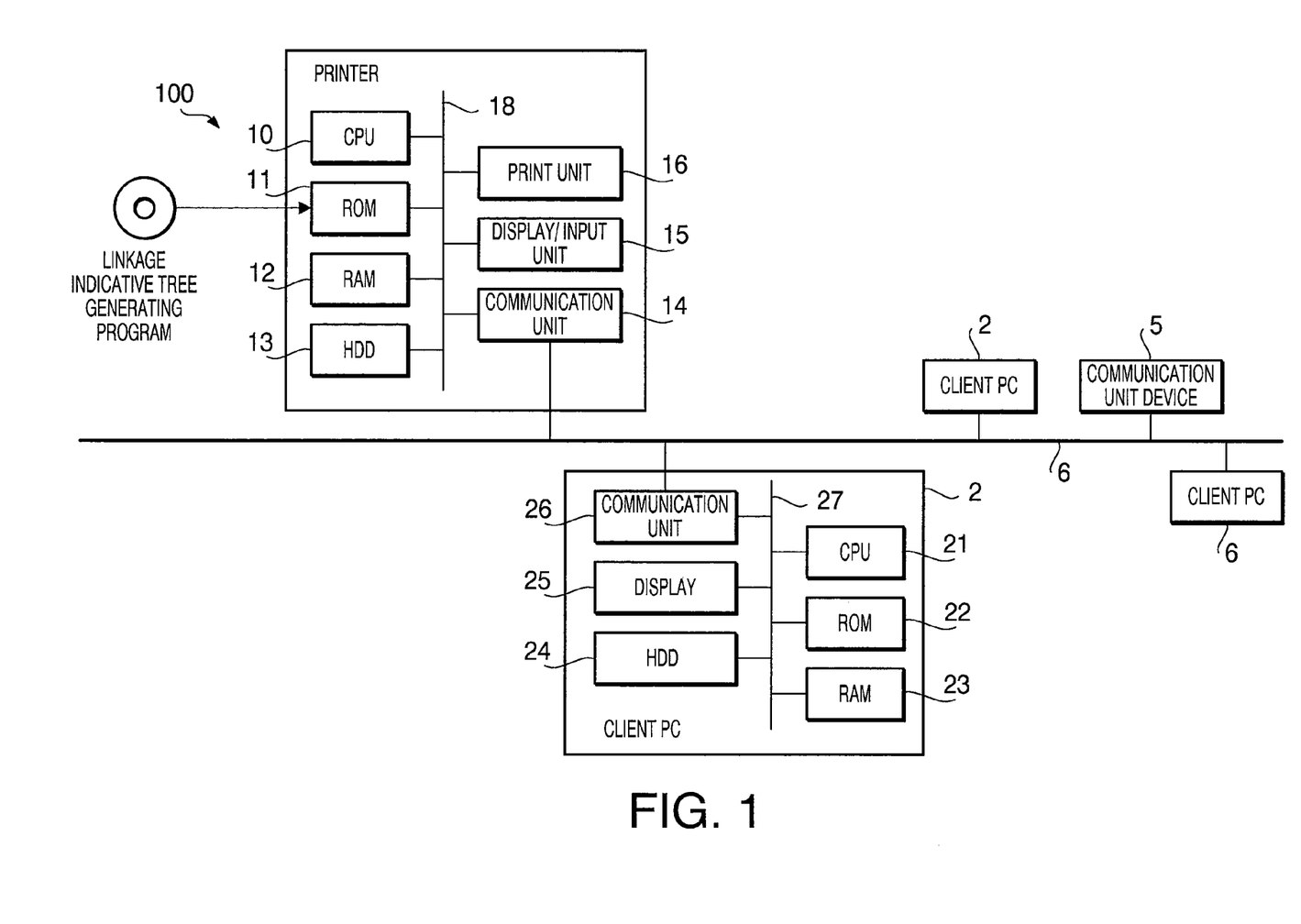
FIG. 1 shows a block diagram to illustrate a network including a printer and client PCs according to an embodiment of the present invention.

Hereinafter, an embodiment according to an aspect of the present invention will be described with reference to the accompanying drawings. FIG. 1 shows a block diagram to illustrate a network system 100 including a printer 1 and client PCs (personal computers) 2 according to the embodiment of the present invention. The printer 1 and a plurality of client PCs 2 are connected with one another through a LAN 6. Each of the client PCs 2 are connected to the internet through a communication device 5 (e.g., a router) to communicate with another device in an external environment beyond the LAN 6.

The printer 1 is provided with a ROM 22, a RAM 12, an HDD (hard disk drive) 13, and a communication unit 14. The ROM 22 can store a program to control entire operations of the printer 1. The RAM 12 can temporarily store data in process. The HDD 13 can store various data. The communication unit 14 serves as an interface to connect the printer 1 with the LAN 6. The printer 1 is further provided with a display/input unit 15 and a printing unit 16. The display/input unit 15 includes buttons and a touch-sensitive screen, through which a user's instruction to the printer 1 is entered. The printing unit 16 is driven to form an image on a recording medium. Furthermore, the printer 1 includes a CPU 10, which controls the ROM 11, the RAM 12, the HDD 13, the communication unit, the display/input unit 15, and the printing unit 16. These units are connected with one another through a bus 18. According to the present embodiment, a linkage indicative tree generating program, which is a program to generate a link indicative tree, is stored in the ROM 11.

Each of the client PCs 2 is provided with a CPU 21, a ROM 22, a RAM 23, an HDD 24, a display 25, and a communication unit 26, which are connected with one another by a bus 27. The client PC 2 is connected to the LAN 6 through the communication unit 26. Application programs can be installed in the ROM 22 and executed by the CPU 21 to achieve various functionalities.

In the present embodiment, it is assumed that a user of the client PC 2 collects necessary information through the internet. The user operates the client PC 2 to access various web sites by using a browser program to find desired information. When the user reaches to a desired web site, the user browses web pages (i.e., an information resource) included in the web sites.

When the desired information is found in the web page, a print instruction, i.e., an instruction to print contents of the web page, is provided to the client PC 2, and the information included in the web page is transmitted to the printer 1 to be printed. When the web page currently being displayed includes linkage information, which is information concerning another web page being linked to the current web page, and when the user performs an operation to use the linkage information to view information included in the linked web page, the web pages are switched. When the switched web page is displayed, the user can again provide an instruction to print the information on the switched web page to the client PC 2 so that the printer 1 performs the printing operation. As the web pages are switched based on the linkage information, data for linkage indicative tree to indicate the linkage structure is generated in the printer 1 by the linkage indicative tree generating program. The generated linkage indicative tree is accumulated as the web pages are switched based on linkage information included in the web pages and can be finally printed by the printer 1.

Figure 2:
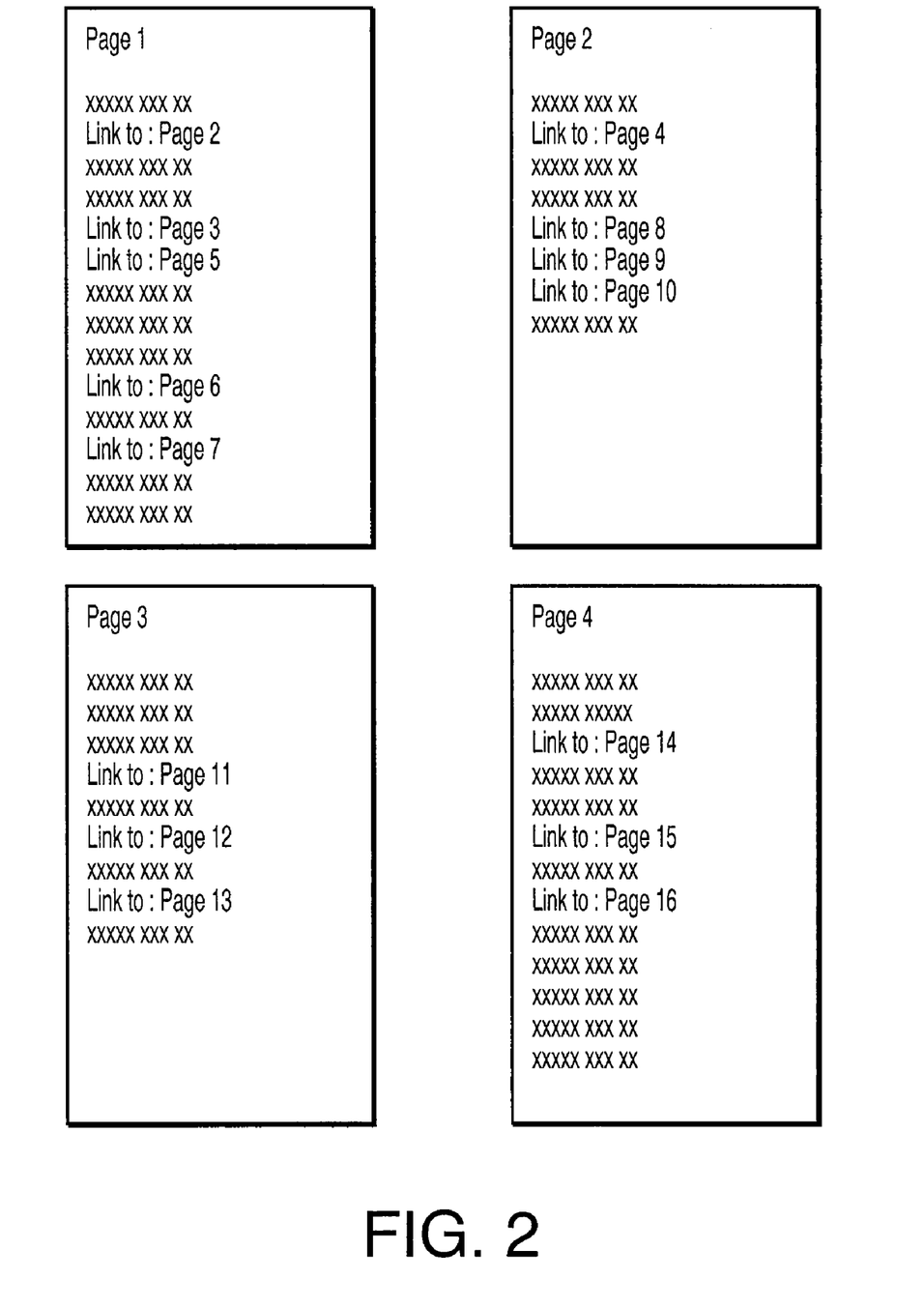
FIG. 2 illustrates linkage structures of interrelated web pages included in a web site.

Hereinafter, the linkage indicative tree generating program according to the embodiment of the present invention will be described. FIG. 2 illustrates linkage structures of interrelated web pages included in a web site. The web pages included in the web site are interrelated with one another, and one web page can be switched to another, and vice versa, based on linkage information according to the user's operation to specify the linked web page. As shown in FIG. 2, a web page 1 includes linkage information concerning web pages 2, 3, 5, 6, and 7. In the present embodiment, it is assumed that the user browses the web pages 1, 2, and 3 in the order given by using the linkage information and attempts to print the information described in the web pages 1, 2, and 3 by the printer 1.

Figure 3:
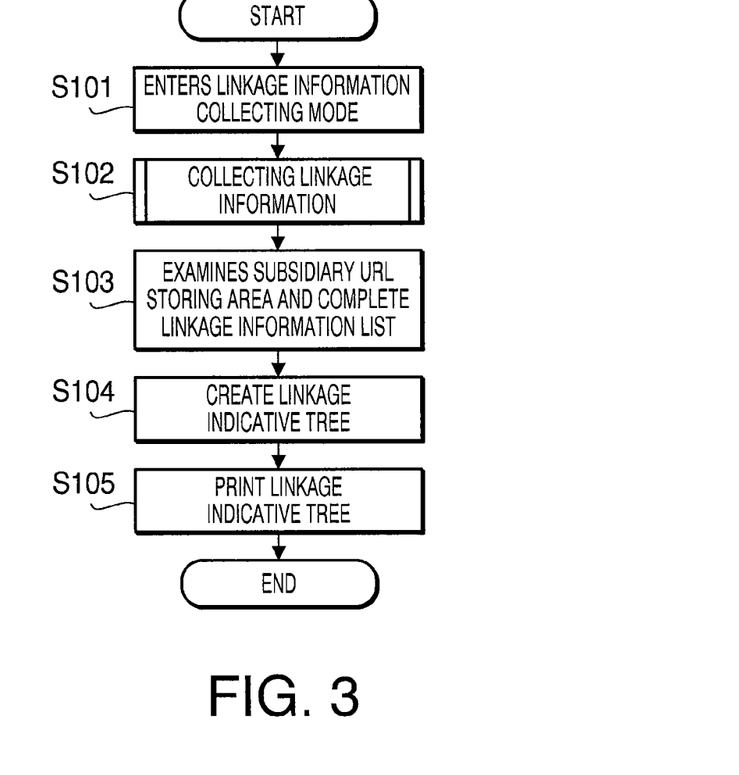
FIG. 3 is a flowchart to illustrate a main flow of a linkage indicative tree generating program to be executed in the printer according to the embodiment of the present invention.
Figure 4:
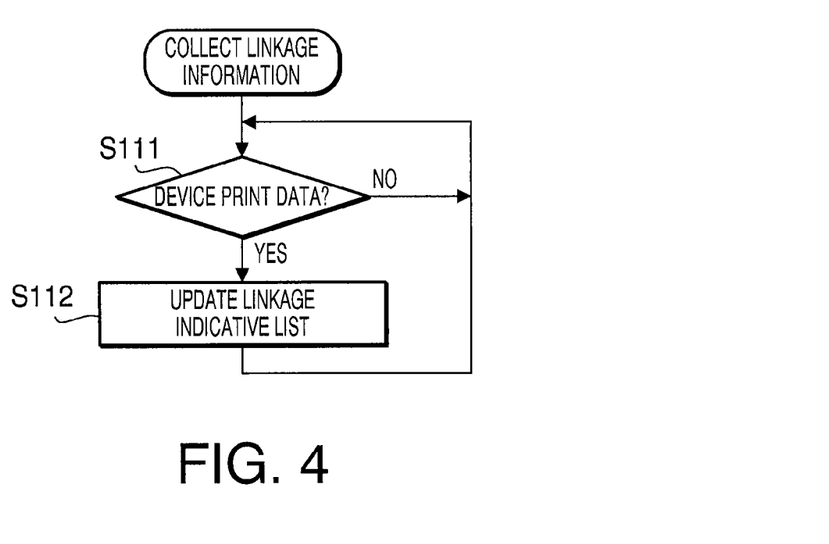
FIG. 4 is a flowchart to illustrate a sub-flow of the linkage indicative tree generating program to be executed in the printer according to the embodiment of the present invention.

FIG. 3 is a flowchart to illustrate a main flow of the linkage indicative tree generating program to be executed in the printer 1 according to the embodiment of the present invention. FIG. 4 is a flowchart to illustrate a sub-flow of the linkage indicative tree generating program to be executed in the printer 1 according to the embodiment of the present invention.

The display 25 of the client PC 2 presents the contents in the web page 1 to the user. When the user provides the print instruction for the web page 1 to the client PC 2, the data for printing, which is generated based on the contents in the web page 1, is transmitted to the printer 1 to be printed. In this regard, if the user wishes to create a linkage indicative tree, the user is required to operate a tree creation start button (not shown) in the display/input unit 15. When the tree creation start button is operated, the CPU 10 of the client PC 2 activates the linkage indicative tree generating program. Hereinafter, in the present embodiment, the web page of which contents are instructed to be printed is referred to as a primary web page, and the web page of which linkage information is included in the primary web page is referred to as a subsidiary web page.

As the linkage indicative tree generating program is activated, the main flow shown in FIG. 3 is initiated. In S101, the printer 1 enters a linkage information collecting mode, and a collecting period of linkage information starts. Next, in S102, linkage information concerning the web page 1 is collected. It is to be noted that the linkage information is not collected in a normal printing operation in which the tree creation start button is not operated and the linkage indicative tree generating program is inactivated.

The linkage information is collected in the sub-flow in the printer 1 as shown in FIG. 4. In S111, it is judged as to whether the print data for the primary web page (i.e., the web page 1) is received. When the print instruction for the web page 1 being displayed in the display 25 is provided to the client PC 2, the print data representing the web page 1 is transmitted to the printer 1. When the printer 1 receives the print data (S111: YES), the printing unit 16 is driven to print the contents of the web page 1 based on the print data. If no print data is received (S111: NO), the flow repeats S111. Next, in S112, a linkage information list is created. FIGS. 5A-5D illustrate state transition of a linkage information list being created in the printer 1 according to the embodiment of the present invention.

Figure 5A:
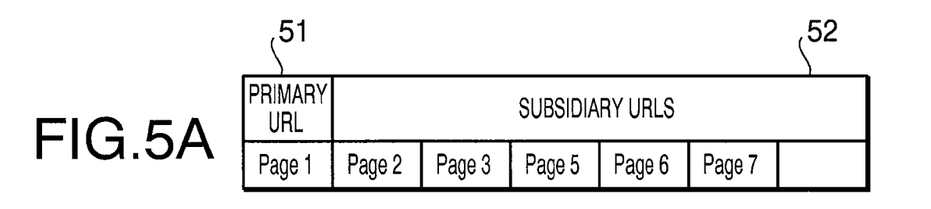
FIGS. 5A-5D illustrate transition of a linkage information list being created in the printer according to the embodiment of the present invention.

The web page 1 being the primary web page includes various data. Specifically, the web page 1 includes a URL of the web page 1 (hereinafter referred to as a primary URL), which indicates a location of the web page 1 itself, and URLs of the web pages 2, 3, 5, 6, 7 (hereinafter referred to as subsidiary URLS), which are related with the web page 1. The primary URL and the subsidiary URLs are obtained from the web page 1 to be stored in the RAM 12. In the present embodiment, the RAM 12 has a primary URL storing area 51 to store the primary URL and a subsidiary URL storing area 52 to store the subsidiary URLs. Therefore, the primary URL is obtained and stored in the primary URL storing area 51, and the secondary URLs are obtained and stored in the subsidiary URL storing area 52. FIG. 5A shows the linkage information list, in which the linkage relation of the web page 1 with the we pages 2, 3, 5, 6, 7 is indicated.

Figure 5B:
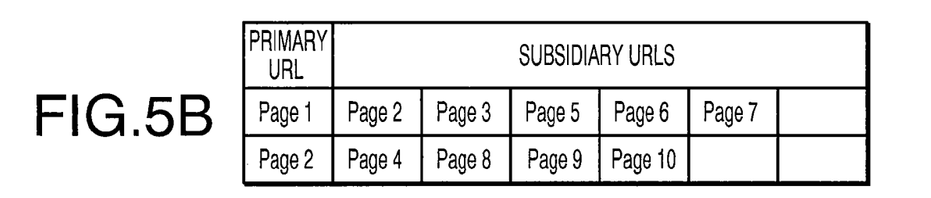

Next, the user of the client PC 2 switches the web pages to the web page 2 according to the linkage indicated in the web page 1 and provides a print instruction for the web page 2 to the client PC 2. At this point, the web page 2 becomes the primary web page, and a web page of which linkage is included in the web page 2 becomes the subsidiary web page. The printer 1 receives the print data concerning the web page 2 (S111: YES). Thereafter, the printing unit 16 is driven to print the contents of the web page 2 based on the print data. Next, in S112, the linkage information list is updated as shown in FIG. 5B. The URL of the web page 2 is added to be stored in the primary URL storing area 51, and the URLs of the web pages 4, 8, 9, 10 are added to be stored in the subsidiary URL storing area 52.

Figure 5C:
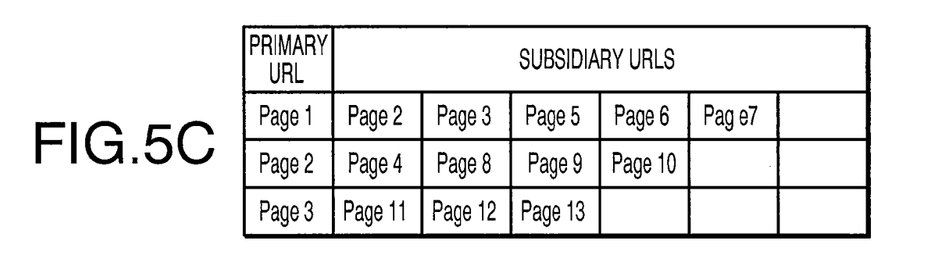

Next, the user of the client PC 2 switches the web pages once again to the web page 1, and to the web page 3 according to the linkage indicated in the web page 1. When the web page 3 is displayed, the user provides a print instruction for the web page 3 to the client PC 2. At this point, the web page 3 becomes the primary web page, and a web page of which linkage is included in the web page 3 becomes the subsidiary web page. The printer 1 receives the print data concerning the web page 3 (S111: YES). Thereafter, the printing unit 16 is driven to print the contents of the web page 3 based on the print data. Next, in S112, the linkage information list is updated as shown in FIG. 5C. The URL of the web page 3 is added to be stored in the primary URL storing area 51, and the URLs of the web pages 11, 12, 13 are added to be stored in the subsidiary URL storing area 52.

Figure 5D:
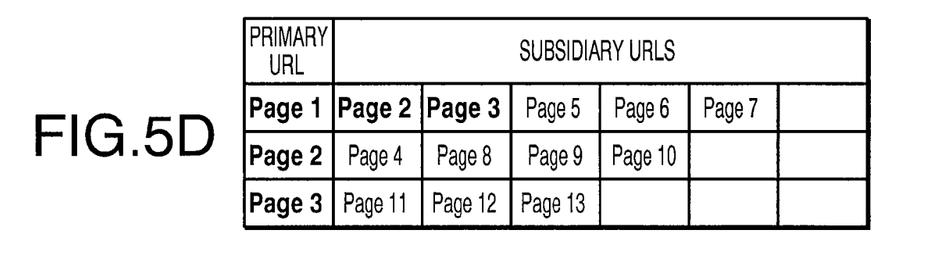

If the user determines that no further information to be printed is necessary, the user presses a tree creation complete button (not shown) in the display/input unit 15 of the client PC 2. When the instruction to complete the linkage indicative tree is entered in the CPU 10 of the printer 1, in S103, the collecting period terminates, and the linkage information list is completed based on the last-updated linkage information list (i.e., FIG. 5C). In this step, the primary URLs stored in the primary URL storing area 51 are examined respectively to judge as to whether the URLs stored in the primary URL storing area 51 are stored in the subsidiary URL storing area 51 as secondary URLs of the secondary web pages which are linked to the other primary web pages. For example, the URL of the web page 2 is examined as to whether it is included in the subsidiary URL storage area 52. As shown in FIG. 5C, the URL of the web page 2 is included in the subsidiary URL storing area 52 as a subsidiary URL with respect to the URL of the web page 1. Similarly, the URL of the web page 3 is examined, and it is found that the URL of the web page 3 is included in the subsidiary URL storing area 52 as a subsidiary URL with respect to the URL of the web page 1. FIG. 5D shows the complete linkage information list, in which the linkage relation of the web page 1 with the web pages 2, 3, 5, 6, 7, the relation of the web page 2 with the web pages 4, 8, 9, 10, and the relation of the web page 3 with the web pages 11, 12, 13, are indicated. In FIG. 5D, the interrelated web pages 1, 2, 3, of which contents have been printed by the printer 1, are indicated by boldface. Meanwhile, the remaining web pages, of which contents are not printed, are indicated by normal face. Next, in S104, a linkage indicative tree is created based on the linkage information list.

Figure 6:
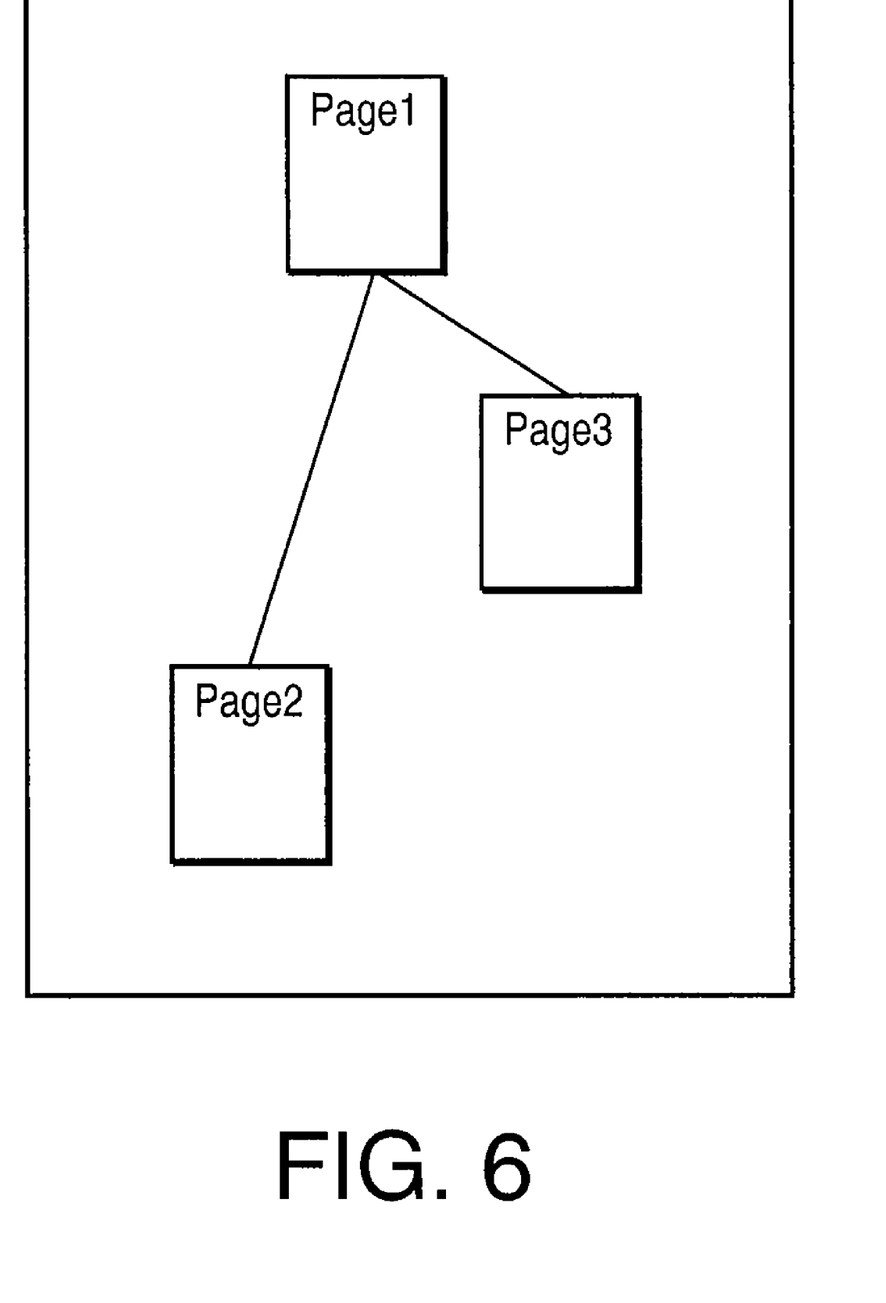
FIG. 6 illustrates a linkage indicative tree generated by the linkage indicative tree generating program according to the embodiment of the present invention.

The interrelation of the primary web pages 1, 2, 3, of which contents have been printed, can be presented in a tree structure shown in FIG. 6. FIG. 6 illustrates the linkage indicative tree, in which the web pages 1 and 2 are linked with each other and the web pages 1 and 3 are linked with each other, generated by the linkage indicative tree generating program according to the embodiment of the present invention.

When the tree creation complete button is operated in the client PC 2, the signals corresponding to the operation is transmitted to the printer 1, and data for the linkage indicative tree as shown in FIG. 6 is generated based on the linkage information list, and in S105 (FIG. 3), the linkage indicative tree is printed by the printing unit 16.

In the present embodiment, it is to be noted that the user can access each of the web pages, which are not limited to the web pages 1, 2, 3, by using the linkages included in the respective web pages. However, in the linkage indicative tree generating program according to the present embodiment, the web pages of which contents were not printed are not presented in the tree structure, but only the web pages of which contents were printed (i.e., the primary web pages) are included in the linkage indicative tree.

Next, an example, in which the web pages 1, 2, 4, 14 (see FIG. 2) included in the web site are printed, will be described. FIGS. 7A-7E illustrate state transition of a linkage information list being created in the printer 1 according to the embodiment of the present invention.

Figure 7A:
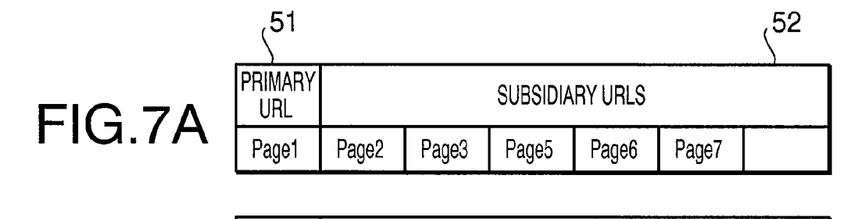
FIGS. 7A-7E are tables to illustrate a process to generate a linkage information list according to the embodiment of the present invention.
Figure 7B:
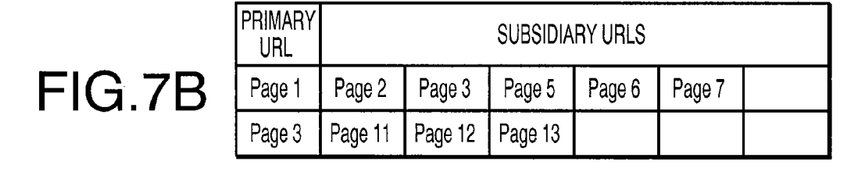

The display 25 of the client PC 2 presents the contents in the web page 1 to the user. According to a print instruction for the web page 1, the web page 1 becomes the primary web page, and the contents of the web page 1 are printed by the printer 1. Thereafter, the user switches the web pages to the web page 3 according to the linkage indicated in the web page 1. The web page 3 becomes the primary web page, and the contents in the web page 3 are printed by the printer 1. In this regard, the linkage information concerning the web pages 1, 3 are collected according to the flow shown in FIG. 4. Thus, in S111 and S112, the linkage information list as shown in FIGS. 7A and 7B are created.

Figure 7C:
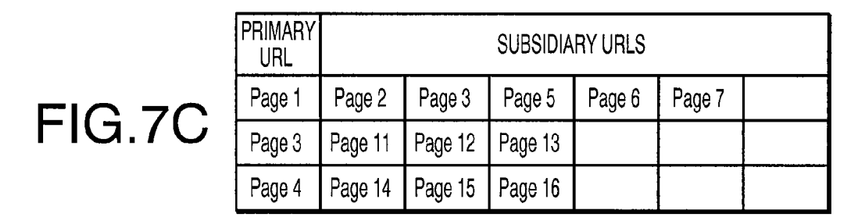

Next, the user of the client PC 2 accesses the web page 4. In this regard, the user may use the linkage included in the web pages in the web site or directly enter the URL of the web page 4. When the user provides a print instruction for the web page 4, the web page 4 becomes the primary web page, and the contents in the web page 4 are printed by the printer 1. Further, the linkage information concerning the web page 4 is collected, and the linkage information list is updated to be as shown in FIG. 7C.

Figure 7D:
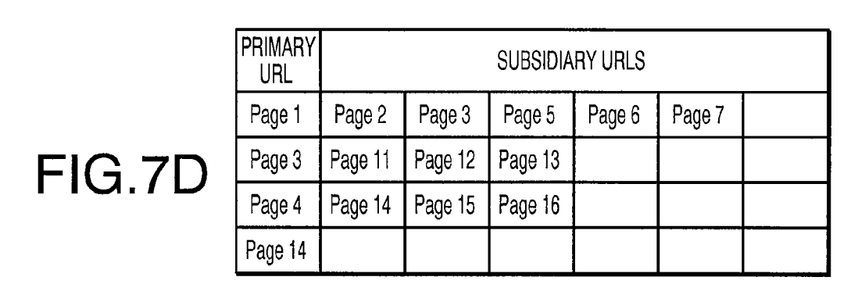

When the contents of the web page 14 are displayed in the display 25 of the client PC 2 according to the user's operation (i.e., either the user uses the linkage included in the web page currently being displayed or the user directly enters the URL of the web page 14), and when the user provides a print instruction for the web page 14, the web page 14 becomes the primary web page, and the contents of the web page 14 are printed by the printer 1. Further, the linkage information concerning the web page 14 is collected, and the linkage information is updated be as shown in FIG. 7D.

Figure 7E:
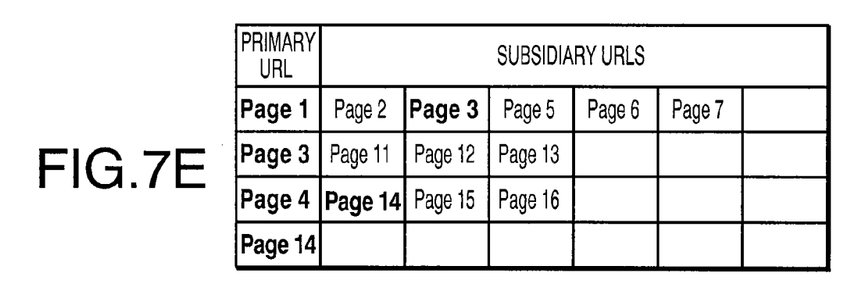

When the tree creation complete button is operated by the user, and collection of the linkage information is terminated, print data for the linkage indicative tree is generated based on the linkage information list. In this step, the primary URLs stored in the primary URL storing area 51 are examined respectively to judge as to whether the URLs stored in the primary URL storing area 51 are stored in the subsidiary URL storing area 51 as secondary URLs of the secondary web pages which are linked to the other primary web pages. In FIG. 7E, the interrelated web pages 1, 3, 14, of which contents have been printed by the printer 1, are indicated by boldface. Meanwhile, the remaining web pages, of which contents are not printed, are indicated by normal face. Among the contents of the web pages having been printed, it is to be noted that the web page 1 is linked with the web page 3, and the web page 4 is linked with the we page 14, but the web pages 1, 4 and the web pages 3, 14 are not interlinked.

Figure 8:
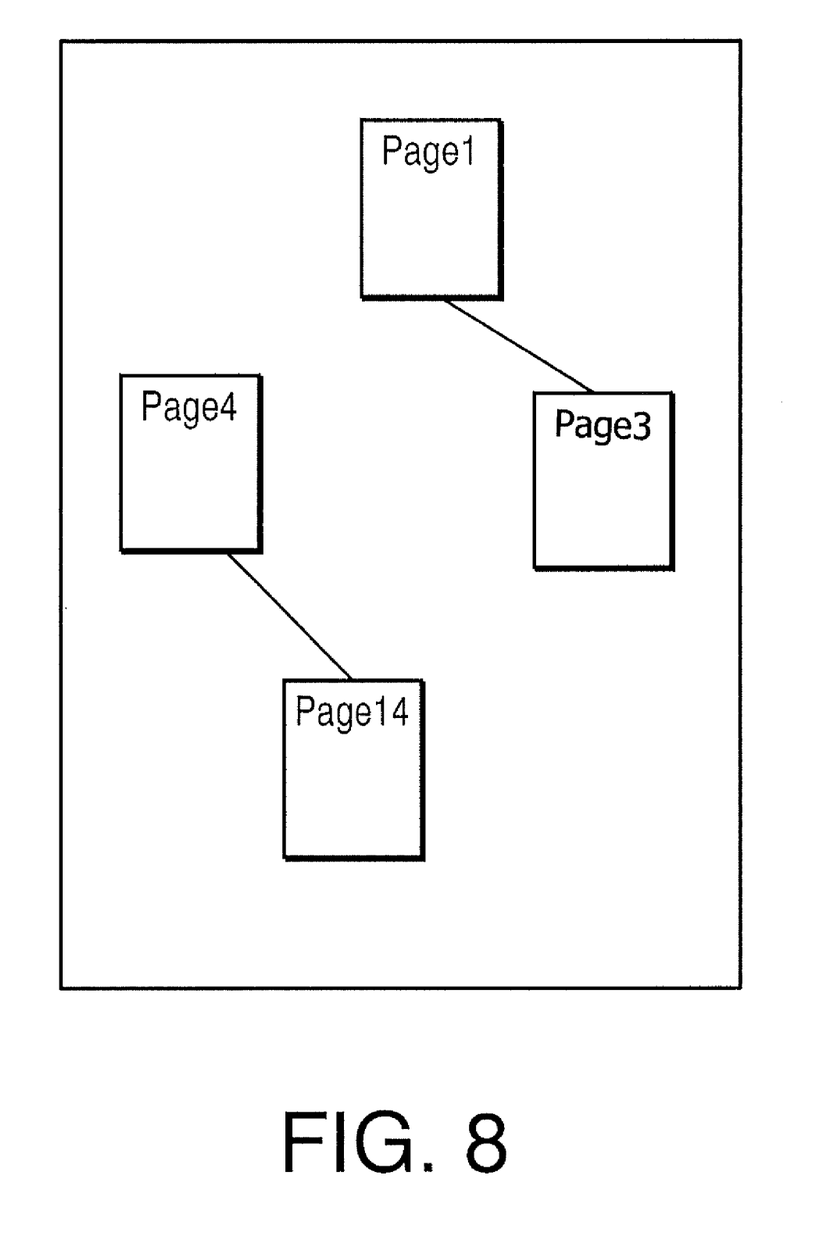
FIG. 8 illustrates linkage indicative trees generated by the linkage indicative tree generating program according to the embodiment of the present invention.

FIG. 8 illustrates the linkage indicative trees generated by the linkage indicative tree generating program according to the embodiment of the present invention. When the tree creation complete button is operated in the client PC 2, the signals corresponding to the operation is transmitted to the printer 1, and data for the linkage indicative trees as shown in FIG. 8 is generated based on the linkage information list, and in S105 (FIG. 3), the linkage indicative trees are printed by the printing unit 16. In FIG. 8, it is to be noted that the web page 1 and the web page 3 are interlinked with each other, and the web page 4 and the web page 14 are interlinked with each other. Meanwhile, the web pages 1, 4 and the web pages 3, 14 are not interlinked. Thus, even when linkage is not established between the web pages, and a plurality of linkage indicative trees are generated, the URLs of the web pages having been accessed in successive operations during the collecting period are collected to generate a linkage information list so that the plurality of linkage indicative trees can be printed on a single plane of a recording medium collectively. Therefore, the relationship between the plurality of interrelated web pages and unrelated web pages can be easily recognized.

According to the linkage indicative tree generating program, as shown in FIGS. 6 and 8, only the web pages of which contents were printed are indicated in the linkage indicative trees in the simple manner, and the other web pages of which contents were not printed are excluded from the linkage indicative trees. Therefore, for example, the user can keep the printed linkage indicative trees together with the printed contents of the web pages so that the relation among the web pages of which contents were printed can be easily recognized afterwards by the user and the others as well. Additionally, when the user or the other users attempt to access the web page of which contents were printed afterwards through the internet, a path to the web pages can be easily found by referring to the printed linkage indicative trees.

In the present embodiment, the printed linkage indicative trees contain substantially square-shaped frames, which indicate the web pages, with description to recognize the web pages. The description may be, for example, key words which links the currently displayed web page and the web page to be displayed, or thumbnailed images representing the web page. The description may further be initial words included in the web page.

Although an example of carrying out the invention has been described, those skilled in the art will appreciate that there are numerous variations and permutations of the method to generate the linkage indicative tree, the computer usable medium, and the printing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the client PC 2 which displays the information resources obtained through the internet may be replaced with any other device as long as the device can communicate with the printer, in which the linkage indicative tree generating program can be executed. For example, the device may be a cell phone or an electronic appliance connectable with the printer 1.

For another example, the printer 1 may be replaced with a multifunctional peripheral which is equipped with a printing unit.

Further, the linkage indicative tree generating program may be stored in one of storage units in the client PC 2 when the client PC is provided with substantial processing capacity. In such a configuration, the linkage indicative trees can be generated in the client PC 2, and data to represent the linkage indicative trees can be transmitted to the printer 1 to be printed.

Figure 9:
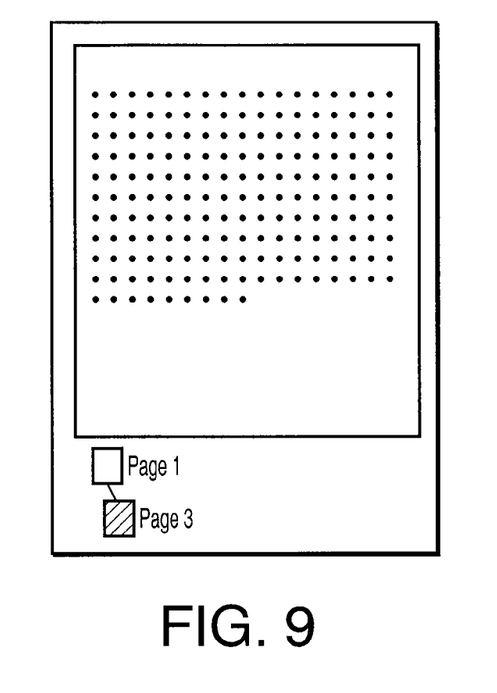
FIG. 9 illustrates a linkage indicative tree generated by the linkage indicative tree generating program according to the embodiment of the present invention.

Furthermore, in the embodiment described above, the linkage indicative trees are generated based on the accumulated linkage information to be printed in one plane upon an operation to the tree creation complete button. However, the linkage indicative tree can be generated and printed each time contents of an information resource are printed. For example, when the contents of the web page 3 including the linkage information as shown in FIG. 2 are printed, a linkage indicative tree indicating the linkage information which has been collected heretofore can be generated. FIG. 9 illustrates such a linkage indicative tree generated based on the linkage information having been collected heretofore according to another embodiment of the present invention. As shown in FIG. 9, the generated linkage indicative tree may be printed on a lower portion of the sheet while the contents of the web page 3 can be printed on an upper portion of the sheet.

What is claimed is:

1. A method to generate linkage indicative data for a linkage indicative diagram that represents a linkage between a plurality of information resources being interrelated with each other, in a printing apparatus, comprising:

collecting a plurality of primary linkage information respectively identifying only a plurality of information resources that, while being displayed, have been instructed to be printed by a user, and subsidiary linkage information included in each of the plurality of information resources, the subsidiary linkage information identifying a subsidiary information resource;

storing the collected subsidiary linkage information in association with corresponding one of the plurality of primary linkage information in a storage;

determining the linkage between the plurality of information resources, one of the plurality of information resources being linked to another of the plurality of information resources if the primary linkage information of the one of the plurality of information resources is included in the subsidiary linkage information associated with another of the plurality of primary linkage information; and creating linkage indicative data to represent a linkage indicative diagram that represents the linkage between only a plurality of information resources that have been instructed to be printed based on the linkage determined by the determining.

2. The method to generate the linkage indicative data according to claim 1,
wherein the primary linkage information and the subsidiary linkage information are collected during a collecting period that starts upon an activating instruction given by a user and terminates upon a completing instruction given by the user.

3. The method to generate the linkage indicative data according to claim 2,
wherein the linkage indicative data includes data to represent a plurality of unrelated linkage indicative diagrams when unrelated information resources are respectively accessed to be printed during the collecting period; and
wherein the plurality of unrelated linkage indicative diagrams are printed collectively by the printing apparatus.

4. The method to generate the linkage indicative data according to claim 1,
wherein the primary linkage information and the subsidiary linkage information are location information to represent a location of each information resource to be stored.

5. The method to generate the linkage indicative data according to claim 1,
wherein one of the plurality of information resources can be accessed by referring to the subsidiary linkage information included in another one of the plurality of information resources while the another one of the plurality of information resources is being accessed.

6. The method to generate the linkage indicative data according to claim 1,
wherein the printing apparatus to generate the linkage indicative data is connected with a network through an information processing apparatus and obtains the plurality of information resources along with the primary and subsidiary linkage information through the network and the information processing apparatus.

7. The method to generate the linkage indicative data according to claim 1,
wherein the linkage indicative diagram is printed by the printing apparatus upon completion of creating the linkage indicative data according to a diagram print instruction given by the user.

8. A computer readable storage device comprising computer readable instructions to control a printing apparatus to generate linkage indicative data for a linkage indicative diagram that indicates a linkage between a plurality of information resources being interrelated with each other, by executing steps of:

collecting a plurality of pieces of primary linkage information respectively identifying only a plurality of information resources, that while being displayed, have been instructed to be printed by a user, and subsidiary linkage information included in each of the plurality of information resources, the subsidiary linkage information identifying a subsidiary information resource;

storing the collected subsidiary linkage information in association with corresponding one of the plurality of pieces of primary linkage information in a storage;

determining the linkage between the plurality of information resources, one of the plurality of information resources being linked to another of the plurality of information resources if the primary linkage information of the one of the plurality of information resources is included in the subsidiary linkage information associated with another of the plurality of primary linkage information; and creating linkage indicative data to represent a linkage indicative diagram that represents the linkage between only a plurality of information resources that have been instructed to be printed based on the linkage determined by the determining.

9. The computer readable storage device according to claim 8,
wherein the instructions control the printing apparatus to collect the primary linkage information and the subsidiary linkage information during a collecting period that starts upon an activating instruction given by a user and terminates upon a completing instruction given by the user.

10. The computer readable storage device according to claim 9,
wherein the linkage indicative data includes data to represent a plurality of unrelated linkage indicative diagrams when unrelated information resources are respectively accessed to be printed during the collecting period; and
wherein the instructions control the printing apparatus to print the plurality of unrelated linkage indicative diagrams collectively.

11. The computer readable storage device according to claim 8,
wherein the primary linkage information and the subsidiary linkage information are location information to represent a location of each information resources to be stored.

12. The computer readable storage device according to claim 8,
wherein one of the information resources can be accessed by referring to the subsidiary linkage information included in another one of the information resources while the another one of the information resources is being accessed.

13. The computer readable storage device according to claim 8,
wherein the instructions control the printing apparatus to print the linkage indicative diagram upon completion of creating the linkage indicative data according to a diagram print instruction given by the user.

14. A printing apparatus to print a linkage indicative diagram that represents a linkage between a plurality of information resources being interrelated with each other, comprising:
a processor for executing a program for controlling the printing apparatus to print the linkage diagram, the program comprising:
a collecting unit to collect a plurality of pieces of primary linkage information respectively identifying only a plurality of information resources, that while being displayed, have been instructed to be printed by a user, and subsidiary linkage information included in each of the plurality of information resources, the subsidiary linkage information identifying a subsidiary information resource;
a storing unit to store the collected subsidiary linkage information in association with corresponding one of the plurality of pieces of primary linkage information in a storage;
a determining unit to determine the linkage between the plurality of information resources, one of the plurality of information resources being linked to another of the plurality of information resources if the primary linkage information of the one of the plurality of information resources is included in the subsidiary linkage information associated with another of the plurality of primary linkage information; and
a linkage indicative data creating unit to create linkage indicative data to represent a linkage indicative diagram that represents the linkage between only the plurality of information resources that have been instructed to be printed based on the linkage determined by the determining unit; and
a printing unit to print the linkage indicative diagram on a recording medium.

15. The printing apparatus according to claim 14,
wherein the collecting unit collects the primary linkage information and the subsidiary linkage information during a collecting period that starts upon an activating instruction given by a user and terminates upon a completing instruction given by the user.

16. The printing apparatus according to claim 15,
wherein the linkage indicative data includes data to represent a plurality of unrelated linkage indicative diagrams when unrelated information resources are respectively accessed to be printed during the collecting period; and
wherein the printing unit prints the plurality of unrelated linkage indicative diagrams collectively.

17. The printing apparatus according to claim 14,
wherein the primary linkage information and the subsidiary linkage information are location information to represent a location of each information resource to be stored.

18. The printing apparatus according to claim 14, which is capable of accessing one of the information resources by referring to the subsidiary linkage information included in another one of the information resources while the printing apparatus is accessing the another one of the information resources.

19. The printing apparatus according to claim 14, which is connected with a network through an information processing apparatus and obtains the information resources along with the primary and subsidiary linkage information through the network and the information processing apparatus.

20. The printing apparatus according to claim 14, which prints the linkage indicative diagram upon completion of creating the linkage indicative data according to a diagram print instruction given by the user.

* * * * *